(No Model.)
W. B. SNYDER.
ORANGE PICKER.
No. 438,292.      Patented Oct. 14, 1890.
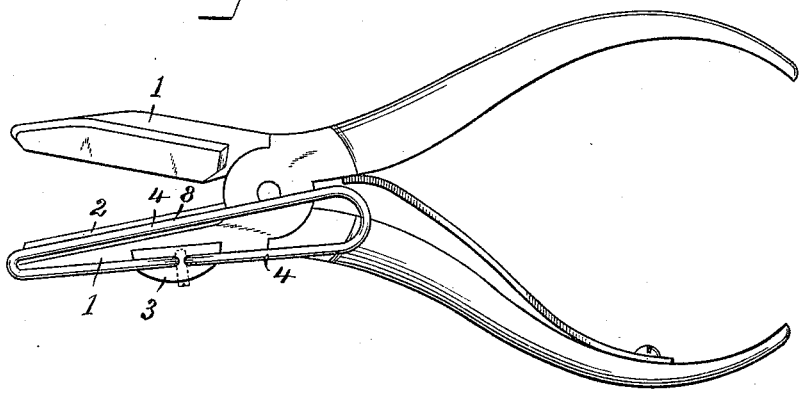
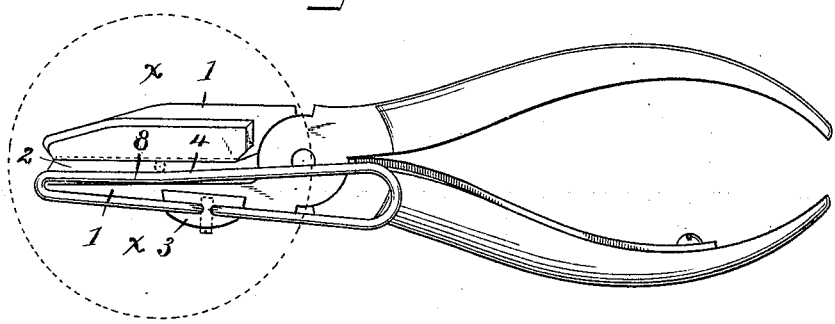
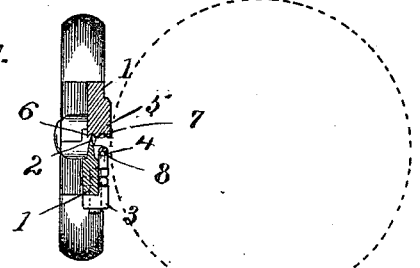
WITNESSES
C. M. Newman,
Arley P. Munson.
INVENTOR
William B. Snyder
By A. M. Wooster
Atty.

United States Patent Office.

WILLIAM B. SNYDER, OF STRATFORD, CONNECTICUT, ASSIGNOR OF ONE-HALF TO WALTER THOMAS, OF NORWALK, FLORIDA.

ORANGE-PICKER.

SPECIFICATION forming part of Letters Patent No. 438,292, dated October 14, 1890.

Application filed August 18, 1890. Serial No. 362,256. (No model.)

*To all whom it may concern:*

Be it known that I, WILLIAM B. SNYDER, a citizen of the United States, residing at Stratford, in the county of Fairfield and State of Connecticut, have invented certain new and useful Improvements in Orange-Pickers; and I do hereby declare the following to be a full, clear, and exact description of the invention, such as will enable others skilled in the art to which it appertains to make and use the same.

My invention has for its object to produce an implement especially adapted for picking oranges. I am of course well aware that various implements for picking fruit and flowers have been previously devised. None of them, however, for various structural reasons, are adapted or in fact can be practically used for picking oranges. The requirements in orange-picking are that handling be avoided; that the stem be severed as close to the orange as possible with a clean, smooth cut, leaving a short stump to be gripped; that the stump upon the orange be held firmly, but with a yielding pressure, and that the implement be so constructed that the entire length of the cutting-blade may be utilized, these requirements not being found in any implement so organized as to adapt it to this use.

In order to produce a simple, durable, and inexpensive tool that will fully meet the requirements of orange-picking, I have devised the novel picker which I will now describe, referring by numbers to the accompanying drawings, forming part of this specification, in which—

Figure 1 is a plan view of my novel picker, the blades being in the open position; Fig. 2, a similar view, the blades being in the closed position as when grasping the stem of an orange; and Fig. 3 is a cross-section of the blades in the closed position as when grasping the stem of an orange, the section-line being indicated by *x x* in Fig. 2.

1 denotes the jaws, which are suitably shaped for the use intended. One of the jaws is provided with a cutting-blade 2 and with a block 3, in which both ends of a double U-spring 4 are attached. The other blade is provided with a block 5, which is provided with a groove 6 to receive the cutting-blade, and a groove 7 registering with the operative face of the spring, which I have indicated by 8.

I have found as the result of experiments for several seasons in an orange grove that the best results are accomplished by the use of a single cutting-blade sharp enough to pass entirely through the stem instead of by blades making a shearing-cut; that a double U-spring having a long operative surface lying parallel with the cutting-edge gives the best results, and that in order to hold large oranges safely it is necessary that both ends of the spring should be rigidly attached in place, the operative face of the spring being made sufficiently long to give the required elasticity. This has led to the special organization herein set forth, the operation of which I find to be still further improved by the use of grooves 6 and 7 in block 5.

Having thus described my invention, I claim—

1. An orange-picker consisting, essentially, of jaws, one of which is provided with a cutting-edge, and a double U-spring attached at both ends and having a straight operative surface lying parallel with the cutting-edge, the other jaw having a block adapted to act in connection with the blade and spring to cut the stem close to the orange but hold the stump firmly.

2. In an orange-picker, a pair of jaws, one of which is provided with a cutting-edge, and a block, in which both ends of a double U-spring are rigidly secured, the other jaw carrying a block having a groove registering with the cutting-edge and another groove registering with the spring, substantially as described and shown.

In testimony whereof I affix my signature in presence of two witnesses.

WILLIAM B. SNYDER.

Witnesses:
A. M. WOOSTER,
ARLEY I. MUNSON.